US009626535B2

(12) United States Patent
Baker et al.

(10) Patent No.: US 9,626,535 B2
(45) Date of Patent: Apr. 18, 2017

(54) INTERACTIVE SYSTEM FOR AN APPARATUS RENDERING MULTIMEDIA CONTENT, DEVICE AND METHODS THEREFOR

(71) Applicant: OXO, Marseilles (FR)

(72) Inventors: Tim Baker, La Ciotat (FR); Vincent Berge, Marseilles (FR)

(73) Assignee: OXO, Marseille (FR)

( * ) Notice: Subject to any disclaimer, the term of this patent is extended or adjusted under 35 U.S.C. 154(b) by 132 days.

(21) Appl. No.: 14/179,948

(22) Filed: Feb. 13, 2014

(65) Prior Publication Data
US 2014/0225714 A1    Aug. 14, 2014

(30) Foreign Application Priority Data

Feb. 13, 2013  (FR) ..................... 13 51203

(51) Int. Cl.
   *G06K 7/10* (2006.01)
   *G09G 5/00* (2006.01)
   *H04W 4/02* (2009.01)
   *H04M 1/725* (2006.01)

(52) U.S. Cl.
   CPC ......... *G06K 7/10009* (2013.01); *G09G 5/003* (2013.01); *H04W 4/021* (2013.01); *G09G 2370/16* (2013.01); *H04M 1/7253* (2013.01)

(58) Field of Classification Search
   CPC ... G06K 7/10009; G09G 5/003; H04W 4/021; H04M 1/7253
   USPC ......... 340/5.9, 5.91, 5.92, 10.1, 10.6, 12.51, 340/13.26
   See application file for complete search history.

(56) References Cited

U.S. PATENT DOCUMENTS

| 2007/0080805 | A1* | 4/2007 | Franklin | G06K 7/10326 340/572.1 |
| 2007/0229265 | A1* | 10/2007 | Takeuchi | G06K 7/0008 340/572.1 |
| 2008/0191864 | A1* | 8/2008 | Wolfson | G06F 3/011 340/524 |
| 2008/0303682 | A1* | 12/2008 | Han | G06F 1/1601 340/686.1 |
| 2010/0271177 | A1* | 10/2010 | Pang | G06K 7/10019 340/10.1 |

(Continued)

OTHER PUBLICATIONS

Search Report and Written Opinion from the Republique Francaise Institut National De La Propriété Industrielle dated Oct. 24, 2013, for Patent Application No. FR1351203 filed Feb. 13, 2013, Applicant, OXO (8 pages).

*Primary Examiner* — Thomas Alunkal
(74) *Attorney, Agent, or Firm* — McCracken & Gillen LLC (57) ABSTRACT

The invention relates to an interactive system (S) for a device including a control unit (UCd), means for releasing multimedia content (Md), with the control unit (UCd) cooperating with said means for providing the control thereof. To enhance the attractiveness of the device, the system (S) comprises a processing unit (UC), at least one tag (T1, T2, Ti, Tn) to be affixed to said means for releasing (Md). Said at least one tag is directly connected to the processing unit and further enables a wireless communication (CP) with a communicating object (Oc). The processing unit (UC) is so arranged as to communicate with the control unit (UCd) in order to trigger an action relative to the multimedia content released in response to a communication initiated by said at least one tag.

15 Claims, 2 Drawing Sheets (56) References Cited

U.S. PATENT DOCUMENTS

| | | | | |
|---|---|---|---|---|
| 2011/0289023 A1* | 11/2011 | Forster | ............ | G06K 19/07703 |
| | | | | 705/500 |
| 2012/0208466 A1* | 8/2012 | Park | ...................... | G06F 1/1601 |
| | | | | 455/41.3 |
| 2012/0208514 A1* | 8/2012 | Park | ...................... | G06F 3/0484 |
| | | | | 455/418 |

* cited by examiner

INTERACTIVE SYSTEM FOR AN APPARATUS RENDERING MULTIMEDIA CONTENT, DEVICE AND METHODS THEREFOR

The invention relates to any device comprising a selection interface (interactive front wall, alphanumeric keyboard, pointing peripheral) enabling a user to directly interact with the device to obtain information relating to a product or a service, or even the supply of said product or of said service. The invention more particularly, but not restrictively, relates to interactive panels or media walls supplying information on locations or prices, etc.

Many interactive media walls are used in public places. They enable the users to very easily browse using menus or multimedia contents generally released through a screen or a monitor. The first shop windows or some food product dispensers for instance offer one or more electronic screens or display cases protected by translucent walls. To select an article or a heading, a user actuates a pointing device of the thumbwheel or "track ball" type. He/she can thus select the reference of one item among a plurality according to various criteria (for example windshield wipers according to the type of vehicle). He/she can additionally buy a ticket in a station, etc. In an alternative solution, a user can enter an alphanumeric string and thus designate or select a product or a service.

The interactivity provided by such devices is however summary. To increase the attractiveness thereof, some suppliers have sometimes provided the main front wall with a touch screen, sometimes with very large dimensions, which thus offers a funnier use. Such solution however revealed extremely expensive and little reliable in case of intensive utilisation, more particularly because of the high cost and fragility of touch screens. In addition, a screen positioned on the front wall of a food product dispenser may hide some products sold, or even conceal these completely. In order to overcome such drawback, other devices have been provided with interactive front walls (for instance implementing the stereovision technique) as substitutes for a keyboard and a touch screen, with said front wall cooperating with a control unit. Such technique consists, for instance, in placing sensors around a generally translucent wall surrounded by a frame lit or backlit by light sources emitting in the visible or near infrared spectrum. Such a device can detect a pointer, for instance a user's finger, placed close to said translucent wall. Using known methods, such as triangulation, for instance, it is possible to know the position of the pointer on the wall with a great accuracy. Whether the device uses a touch screen (with a capacitive, sound or any other detection) or an optical detection front wall, the control unit can be pre-programmed so that a particular position of the pointer triggers the display of an item of information or the dispensing of a product or a service.

These second-generation interactive devices provide a significant improvement as regards ergonomics and attractiveness. However, browsing through the headings or the menus may be tedious. Several operations and selections are generally required to access information relating to a product or a service.

Besides, such devices are limited as regards their capacity to supply information or products. The requested information is generally volatile and available on the screen of the device facing the public only. It is therefore delicate for the user to appropriate or to take this information to use it later. The user often has no other solution but to take handwritten notes or to enter and save such notes on a mobile device, for instance.

To overcome such problem, some interactive devices manufacturers offer to transmit the requested information through a email or a short message (Short Message Service or SMS). For this purpose, a person using an interactive device must, for instance, digitize a bar code, such as a QR (an abbreviation for "Quick Response") code, using an object able to support such function. A bar-code of the QR code type is composed of black modules positioned in a square on a white background. This bar code is a two-dimensional or an array code. The arrangement of the modules determines the encoded information. The latter can be quickly decoded after a reader provided for such purpose, such as a mobile phone, has read the bar code. For instance, such bar code may encode an Internet address. The reader can thus automatically trigger an Internet browser and enable the user to access additional information if a cell network or a wireless (for instance Wi-Fi) network is available to him/her. However, the encoded information is very limited and static. Such a code is not translucent. If it is desired to affix such a bar code in front of a screen, the content released by the latter is partially overshadowed by said bar code.

Proximity or near field communication, more particularly a recent technology also known by the acronym NFC, makes it possible to partially overcome such drawback. A tag (sometimes called a "label" or a "beacon") is substituted for the bar code. Such tag can be read by the reader, (for instance a mobile phone or a tablet supporting such function) using a short-range (generally less than 10 centimeters) wireless communication. Such technology is an extension of the ISO/CEI14443 standard ruling the communication through radio frequency identification (RFID) of proximity maps which combine an interface of the chip card type and a reader within the same peripheral device. Such a tag can be affixed not in front of the screen but behind same so as not to overshadow a part of the content displayed on said screen.

Information however remains static, whether a tag or a bar code is used. The information supplied by a tag further remains not related with the substance of the content released by the releasing means of an interactive device. Such solution thus becomes inappropriate if the released content is dynamic: a carousel can display a large number of articles, products or services which it is desired to associate additional information with. Bar codes could also become parts of the released multimedia content. The information encoded with such a bar code would thus remain static and would further depend on the content itself. In other words, it would be impossible to associate distinct information of a device with a second one sharing the same multimedia content. Similarly, any minor modification of an additional item of information associated with one heading of said content would result in an expensive modification (update and deployment) of the content itself.

The invention makes it possible to overcome all the drawbacks raised by the known solutions by adapting a device including a control unit, means for releasing multimedia content, with the control unit cooperating with said means for providing the control thereof, which integrates an interactive system including a processing unit associated with communication means and a microcontroller, at least one tag including first communication means for directly communicating with the processing unit and the second communication means to enable a wireless communication with a communicating object, when the latter is within range of said at least one tag. The interactivity thus provided by an adapted device can be significantly enhanced by thus connecting one tag or several tags to the processing unit and by arranging the latter so that it triggers an action relating to the multimedia content in response to a communication initiated by one of the tags. Particularly advantageously, the processing unit is so arranged as to communicate with the control unit in order to trigger at least one action implemented by the processing unit comprising the releasing of a request for release (P1) to the processing unit (UCd) for modifying the substance of the multimedia content released by the releasing means (Md), in response to a communication initiated by said at least one tag (T1, T2, Ti, Tn) by the first communication means (Ct) and via the communication means (C1) to said processing unit (UC).

Among the numerous advantages brought by the invention, it can be mentioned that the invention makes it possible to:

maximize the interactivity, attractiveness and ergonomics of devices including multimedia content releasing means;

reduce the costs of manufacturing and maintenance of an interactive device, more particularly including multimedia content releasing means by eliminating touch functions or pointing peripherals and by protecting said releasing means by a translucent, preferably transparent wall;

create a connection between the multimedia content released by the device and information which can be read by a communicating object;

enable a communicating object to act on the multimedia content released by the device;

instantaneously supply information relating to a product or a service, or even collect said product or said service supplied by the releasing means of an interactive device according to the invention;

very simply modify the multimedia content released by an interactive device as well as the information or even the products and services available through the device;

very simply adapt a traditional device through the integration therein of an interactive system according to the invention.

For this purpose, an interactive system is provided for a device including a control unit, communication means or devices for releasing multimedia content, with the control unit cooperating with said means for providing the control thereof. To enhance the attractiveness of the device, the system comprises a processing unit comprising communication means and a microcontroller. The system further includes at least one tag to be affixed to said releasing means. Said at least one tag comprises first communication means for communicating with the processing unit and second communication means for making a wireless communication with a communicating object when the later is within reach of said at least one tag. According to the invention, the processing unit is so arranged as to trigger an action related to the multimedia content released in response to a communication initiated by said at least one tag with said processing unit.

Such an action implemented by the processing unit can advantageously consist in transmitting a request for release to the control unit, which in response modifies the substance of the content released by the releasing means.

If the control unit and the processing unit consist in the same physical entity, an action implemented by the processing unit may alternately consist in directly modifying the substance of the released content. A request may then mean a processing carried out by the same entity. The communication between the two units is thus internal.

In addition, to be able to act on the progress of the releasing of the multimedia content, and to be able to retrieve from the device information which can be analysed or consulted in private later on, or to directly use a service, the invention provides that said at least one tag can comprise a memory, the content of which can be read by a communicating object when a communication is established between the tag and said object, with the action implemented by the processing unit consisting in updating the tag memory.

In order to increase the number of possible interactions, for instance via various sections or regions of the released content, a system according to the invention can comprise a plurality of tags affixed against said releasing means. Then said tags further respectively cooperate with the processing unit to ensure a communication with said processing unit.

According to a particularly advantageous embodiment, the tag(s) can cooperate with the processing unit through a wire, parallel, linear or ring-shaped bus.

The invention provides that the tag(s) can emit a message of detection of an electromagnetic field when said tag has detected the presence of an electromagnetic field generated by a communicating object. The processing unit thus recognizes the tag which the message originates from and can trigger the suitable action.

When the tag(s) comprise(s) a memory readable by a communicating object, the invention provides that said memory can be updated by the processing unit or even the communicating object. The bus can thus advantageously carry a data message to the processing unit or the tag or one of the bus-connected tags.

In order to remotely update the released content, or even the data reproducible by the device through the tag(s) connected to the processing unit, the latter may advantageously comprise communication means for communicating with a second remote processing unit.

According to a second aspect, the invention relates to a device comprising a control unit, means for releasing multimedia content, with the control unit cooperating with said means to provide the control thereof, with said device further comprising an interactive system according to the invention.

Such a device can offer a first level of interactivity through releasing means which consist of a front wall comprising a (possibly touch) screen. As alternative solutions, said releasing means may include an interactive front wall including a screen protected by a translucent wall associated with capacitive or optical means for detecting a pointer. Such a device advantageously combines two additional functions and thus enhances its attractiveness. A first function consists of the detection of the pointer by sensors. The detection means will assign a position to the pointer corresponding to a specific area of the wall or the screen. Such specific area is associated with one piece of information in the multimedia content Md. A second function, complementary to the first one, comprises the transfer of the pointer position to the processing unit via the control unit.

According to a third aspect, the invention further relates to a method for adapting a device including a control unit, means for releasing multimedia content, with the control unit cooperating with said means for ensuring the control thereof. To increase the attractiveness of the device, the method comprises a step of integrating an interactive system according to the invention into said device.

For the system to be able to meet the needs of a user provided with a communicating object and thus enable such user to interact with the released content, the invention relates to a method implemented by a processing unit of an interactive system according to the invention which includes a step of receiving, through the communication means of the processing unit, a message of detection of an electromagnetic field, with said message being emitted by the or one of the tags of the system, a step of knowing the tag having emitted said message, a step of requesting a modification in the substance of the multimedia content released by the releasing means according to the tag having emitted the message of detection of an electromagnetic field.

To enable the user to retrieve a piece of information from the device, and for instance save it and use it later, such a device may further comprise a step of transmitting a data message to the tag having emitted beforehand a message of detection of an electromagnetic field, with said data message consisting in modifying the content of the tag storage means.

To be able to modify the processing resulting from the implementation of such method, if need be, the invention relates to a computer program comprising instructions which can be processed by the microcontroller of the processing unit of an interactive system according to the invention, which, when executed or interpreted by said microcontroller trigger the implementation of the method.

Other features and advantages of the invention will become more apparent when reading the following description and referring to the accompanying drawings, wherein.

Figure 1:
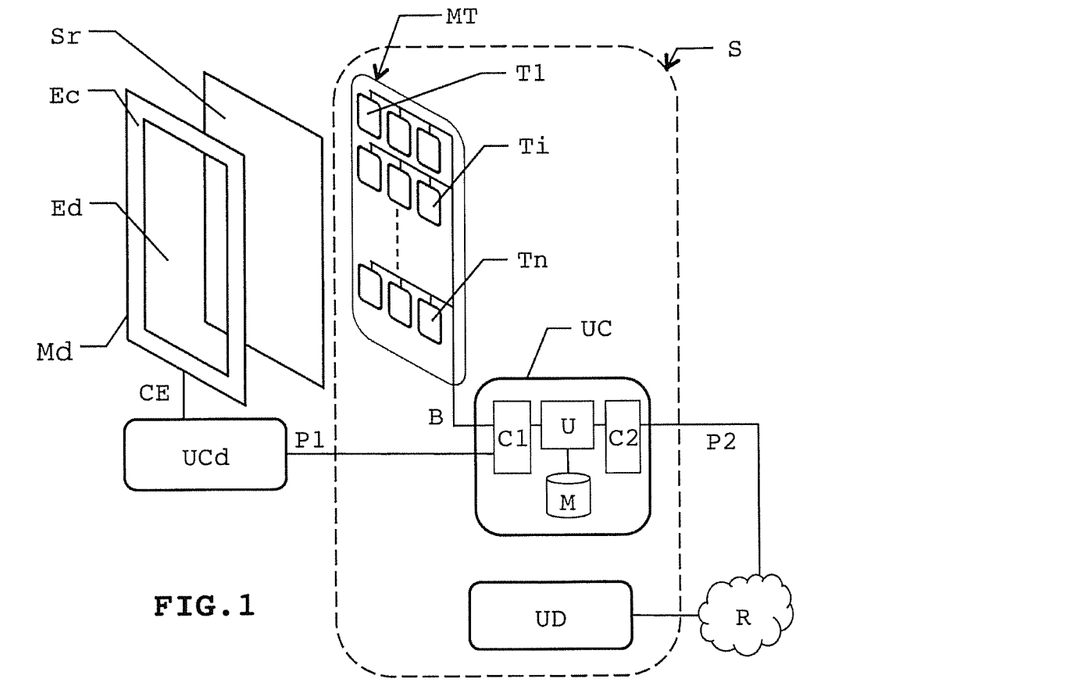
FIG. 1 discloses an interactive system according to the invention integrated in a device comprising means for releasing multimedia content as a video output peripheral device, such as a monitor or an electronic screen.

FIG. 1 discloses an interactive system S according to the invention. Such a system is provided to be integrated into a device (not integrally shown in FIG. 1) which comprises means for releasing Md multimedia content in the form of one or more video output peripheral device(s). According to FIG. 1, such releasing means Md consist of a so-called "LCD" (for Liquid Crystal Display), "LED" (for Light-Emitting Diode), or even "OLED" (for Organic Light-Emitting Diode) screen. The releasing means are in the form of a screen plate Ed with liquid crystals which constitute the points and the colours of an image. Lights located behind the screen plate illuminate the image and make it visible. For a "LCD" screen, lighting is provided by neon tubes located around the screen plate or on the frame Ec surrounding the screen plate Ed. For a "LED" or an "OLED" screen, diodes have been substituted for the neon tubes. To complete backlighting, a reflecting sheet Sr is generally used and applied to the back of the screen plate Ed. The reflecting sheet Sr lets the light through the screen plate Ed toward potential users.

The screen plate Ed can be protected by a translucent, preferably transparent, wall (made of glass or plastic material), not shown in FIG. 1. This protection is particularly useful for devices installed in public places. This wall protects the screen. Such a protective wall may be that of an interactive media wall behind which the screen plate Ed would be provided. It could also be surrounded with a frame comprising optical sensors or be a touch wall to make the wall interactive, by stereovision, for instance. As an alternative solution, if the screen is a touch screen, the protection wall cannot be used.

"Tag", or radio label, more particularly means a small object such as a self-adhesive label, which may be stuck on or integrated in an object or a product. The tag generally comprises an antenna associated with an electronic chip enabling it to receive and/or reply to the requests radio-emitted from an emitter-receiver. The tag may be active, connected or passive.

Tag also means a wireless communication means enabling an electromagnetism-based communication, or any other communication. In another alternative embodiment of the invention, the tag is formed using a radiofrequency technology. An application to the Bluetooth standard may be considered without restricting the invention however.

According to one embodiment, the device comprises only one tag and a plurality of sensors so configured as to detect and determine the position of a pointer (for instance, a user's finger or a cell phone). The tag may then comprise an antenna which at least partly, but preferably totally surrounds the screen. According to another embodiment, the device comprises a tag network, which a plurality of tags is associated with.

The releasing of multimedia content by the releasing means Md is controlled by a control unit UCd which cooperates with the releasing means Md through a conventional link CE, for example in the HDMI (High Definition Multimedia Interface), DVI (Digital Visual Interface) formats, or any other link. The control unit thus determines the substance, scrolling, overlay, ( . . . ) of the multimedia content. It may include storage means—not described while referring to FIG. 1—for storing a plurality of content, or even a computer programme, the instructions of which, as implemented by the control unit, act on the releasing of the content by the releasing means. The control unit UCd can further receive requests for releasing P1 from the outside to act on the content released in response to said requests.

To overcome the drawbacks of the known solutions mentioned above, the invention provides for the addition of a particularly innovative interactive system S to such a device. The system S comprises a processing unit UC. In certain devices, such a processing unit may be the control unit UCd of the device if the latter has been adapted accordingly beforehand. The units UCd and UC may then consist of the same physical entity, or remain different but able to communicate with each other. The example described while referring to FIG. 1 illustrates a processing unit UC different from the control unit UCd. A microcontroller U of the processing unit UC transmits—via communication means C1)—requests for releasing P1 to the control unit so that the latter responsively controls the content released by the releasing means Md. The processing unit further directly communicates through a bus B, for instance, with one or several tag(s) T1 to Tn, each one being able to establish a proximity wireless communication with a communicating object—the object is not shown in FIG. 1. Communicating object, and more particularly a contactless card (for example of the payment card, loyalty card type) means a smartphone or any microelectronic device liable to generate at least one direction of communication with the rest of the system.

Figure 2:
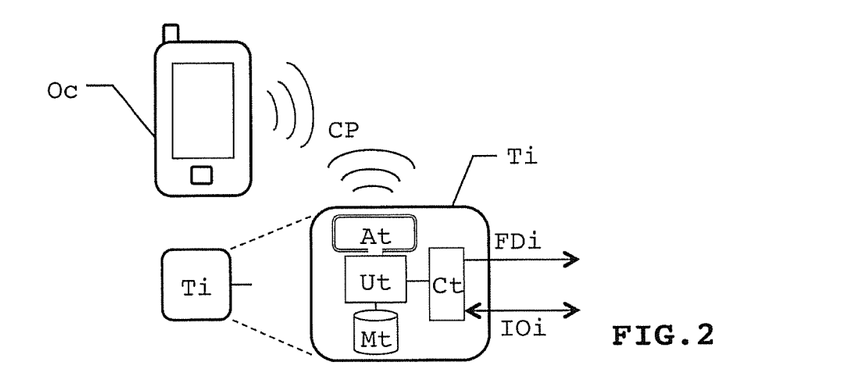
FIG. 2 illustrates a functional diagram of a tag provided to be connected with the processing unit of an interactive system according to the invention, with said tag communicating with a communicating object.

FIG. 2 describes in details a functional diagram of a tag Ti intended to be connected to the processing unit of an interactive system according to the invention. The tag Ti comprises a microcontroller Ut cooperating with first communication means Ct in order to communicate with a remote processing unit such as the unit UC described while referring with FIG. 1. The tag Ti further comprises second communication means At (generally as a coil or an antenna) in order to enable a wireless communication CP with a communicating object Oc. This communication is established when said object (for example a smartphone) is within the range of said tag. The electromagnetic field generated by the object reactivates (by supplying it with sufficient power) the tag (more precisely the microcontroller Ut thereof). Then it is able to communicate, more particularly with the object. The tag Ti may comprise storage means Mt, the content of which can be read or even written by the communicating object. According to a preferred embodiment, the tag is provided with reading and/or writing means. Advantageously, the tag can be read and the content thereof can be modified so as to be able to establish a bidirectional exchange with the communicating object, for instance.

In the present application, tag additionally means tag technologies wherein tag information can only be read, active technologies wherein information can be written and modified over time, for example, by a connection to computer processing means of the system and/or the communicating object, or any other object, in the tag memory, and "reader" (reader/writer) type technologies implying the master operation of the tag, with the communicating object thus having a slave function; tag thus refers to the broad sense of the word and thus covers electronic devices which can operate as master or slave in a master/slave exchange with the communicating object.

According to the invention, the tag is thus connected to a remote processing unit through a data bus. Therefore, the microcontroller Ut of the tag Ti can further emit a signal or a message of detection of an electromagnetic field FDi—through the communication means Ct. The processing unit connected to the tag Ti and adapted to utilize said signal is thus informed by the tag that a communicating object is present close to said tag. The tag communication means Ct may further receive and/or emit data (or data signals) IOi from or to said connected processing unit.

According to a preferred embodiment, the tag Ti is a tag implementing the NFC or RFID technologies. Any other technology able to establish a low range communication could alternately be used to enable the tag to interact with a communicating object.

In connection with the exemplary device described in FIG. 1, the processing unit UC is connected via a communication bus B to a matrix MT of tags T1 to Tn. Each tag is connected to the processing unit through said bus. A preferred example of connection of said tags with the processing unit UC is described in greater details in the following, while referring to FIG. 3.

An interactive system S according to the invention does not require such a tag matrix. Only one tag may be sufficient to detect an object and generate actions connected with the content released by the releasing means (for example a virtual key to stop scrolling) as will be mentioned hereunder.

To provide the desired interactivity, the tag (or the tag matrix MT) is affixed to the releasing means Md, preferably onto the back of said releasing means. For example, and as illustrated in FIG. 1, the tag(s) may advantageously be fixed using glue or an adhesive sheet onto the back of the reflective sheet Sr, itself affixed to the screen plate Ed. Affixing, or more generally fixing (using any fixing means) a tag matrix behind the plate makes it possible to create as many "active zones" within the released content—more precisely in the releasing means—as there are tags. Such a preferably plane tag matrix is thus positioned—without any direct contact being required between said matrix and the back of the releasing means—substantially parallel to the plate plane (or releasing plane). If the releasing means are not plane, the tag matrix will advantageously follow the releasing geometry. If a user places a communicating object close to an "active area" of the plate (for instance corresponding to an article disclosed using the multimedia content or a virtual key). The tag (for instance the tag Ti)—gone through by a virtual axis, further going through the communicating object and the plate—is fed by the electromagnetic field supplied by the object, when the latter is within range of said tag. The tag automatically delivers a signal of detection of an electromagnetic field FDi carried by the bus B. The processing unit UC is thus informed of the presence of an object substantially in the vicinity of an active area of the plate. The processing unit can thus, for instance, trigger a request for release to the control unit in order to modify the substance of the released multimedia content. Such a modification may consist in releasing a second content or in overlaying an information message to the user of the communicating object.

In an alternative solution, the processing unit may trigger an action aiming at updating the memory Mt of the tag which has detected an electromagnetic field. A data signal or message IOi is transmitted to the tag Ti via the bus B by the processing unit UC. The object positioned close to said tag Ti can thus read the content of the memory of said tag. Similarly, if the tag Tn is then prompted (i.e. reactivated) by the communicating object, Tn in turn generates a signal or message of detection of an electromagnetic field FDn. The latter is routed to the processing unit UC by the bus B. The latter in turn triggers an action different from the previous one, with the "active area", i.e. an area of the plate having a determined size around the tag Tn being associated with a second heading of the released multimedia content.

If the control unit UCd of the device and the processing unit UC of the system S consist of the same physical entity, the action implemented by said processing unit consists in directly modifying the substance of the content released by the releasing means Md.

The example disclosed while referring to FIG. 1 more precisely relates to a device of the interactive media wall type comprising a screen in the form of a LCD or LED/OLED plate. As an alternative solution, the invention also makes it possible to provide with a similar interactive system a food product dispenser wherein a food product display case would be substituted for the plate. Besides, any other releasing means could be used, for instance sound ones, or more generally any means able to route information perceptible by one of the user's senses. Similarly, a TV set could further be adapted to implement a teleshopping application, for example. Similarly, the releasing means may consist of a simple screen whereon the multimedia content is projected via a video-projector controlled by the control unit.

Referring to FIG. 1, the invention further provides that the processing unit UC may also be connected to a distinct and remote unit UD. For this purpose, the processing unit UC may comprise communication means C2 to interact with such a remote unit. As an example, the units may thus communicate through the Internet or via a private network R. This way, the tags of the matrix MT are virtually connected to said remote unit UD. The latter may also prepare requests for releasing intended for the control unit UCd routed through the processing unit UC.

Figure 3:
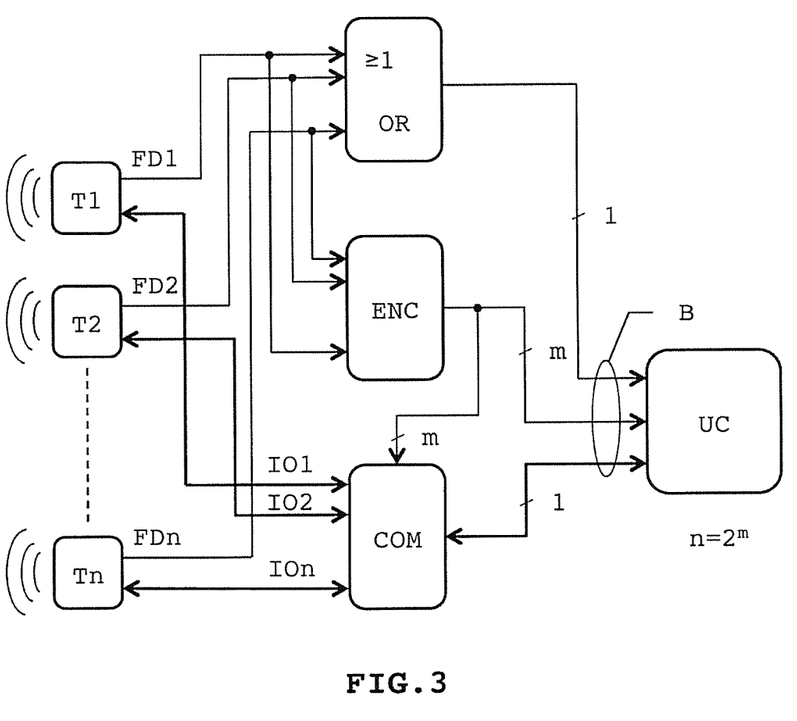
FIG. 3 discloses an embodiment relating to a matrix of tags with the processing unit of an interactive system according to the invention.

FIG. 3 discloses a preferred embodiment of the direct connection of a tag (or of a matrix of tags T1, T2 to Tn) to a processing unit UC. Such connection is schematized, for simplification purposes, by the bus B disclosed while referring to FIG. 1. In FIG. 3, n tags are connected to the processing unit UC. Each tag is similar to the tag Ti disclosed while referring to FIG. 2. They are, each, able to communicate according to a contactless protocol with a communicating object located close thereto. This object is not shown in FIG. 3. As soon as one of the tags is fed with the electromagnetic field generated by such an objet, the tag transmits to the processing unit a signal or message of detection of an electromagnetic field. The tags T1, T2 and Tn thus respectively release the signals FD1, FD2, FDn as soon as they are individually prompted by such an object. Such a signal may advantageously consist in releasing Boolean information: « true» means that an object has reactivated a tag. The absence of any detection is equivalent to the « false» Boolean information.

To route said messages and enable the unit to know which tag has detected an electromagnetic field, the invention provides that a first signal of detection of presence of a communicating object will be created and transmitted to the processing unit. Such a signal may be created by means OR producing the Boolean addition of the signals of detection of an electromagnetic field potentially transmitted by the various tags.

Let it be assumed that the number of tags n is $2^m$. The tags T1 to Tn are also connected to encoding means ENC to encode the messages FD1 to FDn, if any. Said means encode the signals FD1 to FDn and release to a processing unit a value (i−1) encoded on m bits. The processing unit thus knows the tag Ti which has detected an electromagnetic field. The microcontroller U of the processing unit just has to decode the output from the encoder to reach this goal. This embodiment makes it possible to simplify and reduce (n to m) the number of connections required by the processing unit. The exemplary embodiment of the connection B disclosed while referring to FIG. 3 further makes it possible to route data messages or signals IO1 to IOn emitted by the tags to the processing unit. Reciprocally, data messages or signals IO1 to IOn emitted by the processing unit may be routed to the tags or one of the tags in particular. For this purpose, the invention provides to connect the tags to switching means COM addressed by the value m deduced from the means OR or created by the processing unit to multiplex said signals. The invention shall not be limited to such exemplary embodiment. Any other connection could be considered: for example a wire, parallel, serial, linear or ring-shaped bus.

Whatever the means selected to connect one or more tag(s) with a processing unit and whatever the requests or the actions determined to control the multimedia content released by releasing means, the invention significantly increases the interactivity proposed by a device according to the invention.

To further enhance the attractiveness of the devices, one or more application(s) may further be loaded into or pre-installed in the storage means of a communicating object able to interact with one of the tags. The user of said object may then take advantage of additional services: on-line purchase, access to additional, possibly tailored, information (with the, or said tag(s) being able to receive and then transmit to the processing unit data sent by the object).

To be able to implement some applications, the invention provides that the information possibly reproducible by a tag connected to the processing unit may comprise a timestamping of the connection to a communicating object. A TV set, for instance, can thus be adapted by providing it with an interactive system according to the invention (comprising one processing unit connected to one or more tag(s) affixed on the back of the TV set plate) and use it to implement a teleshopping or televote service. When reading the memory of a tag, the communicating object collects data designating an active area of the TV set plate as well as the timestamping of the instant when the communicating object reactivated the tag. Such two pieces of information are sufficient to characterise an article among a plurality of articles presented by the content released by the TV set. Advantageously, the invention enables to synchronise the time when the communicating object reactivated the tag and the image detected at this given time. More precisely, the tag prompted by the communicating object at a given time corresponds to a specific active area of the screen. In an alternative solution, the releasing means Md comprise a video stream which a timestamping is associated with. The detection made thus makes it possible to determine, at a given time, the image or the part of the image appearing on the screen that the user wished to select. An application hosted by the communicating object (a cell phone, for instance) makes it possible to place the thus designated article into the user's virtual basket and then to complete the on-line order of said basket. Similarly, and in an alternative solution, it is possible to designate, using a communicating object, the picture of a deserving candidate participating in reality TV or talent show programs. The user may similarly transmit a supporting vote for instance by SMS, with said SMS message being prepared by an application residing in the object from data designating the active area of the TV set and the time (and/or the date) when the voter designated his/her favourite candidate by positioning his/her cell phone in the direct vicinity of the TV set plate, close to said picture shown by the TV set plate.

The invention thus makes it possible to imagine a large number of different applications based on the principle consisting in linking a tag with the content released by an interactive device.

In reference to the previously described FIG. 1, the invention further provides that the content of the storage means M cooperating with the microcontroller U of the processing unit UC (or even the control unit UCd) can be modified. The invention thus makes it possible to adapt, with a great flexibility, the processing of the various active areas characterised by the position of the tags fixed against the releasing means. As a matter of fact, the microcontroller U of the processing unit can read, and then execute or interpret the instructions from a programme saved in said storage means M to implement a processing method for requesting one of the tags connected to the processing unit by a communicating object. When applied to the example described while referring to FIG. 1, such a method may mainly comprise a first step of receiving through the communication means C1 of the processing unit UC a message of detection of an electromagnetic field FD1, FD2, . . . , FDn emitted by one of the tags T1, T2, . . . , Tn of the system S, followed by a step of knowing and identifying the tag having emitted said message. Such a method may further comprise a step of controlling a modification of the substance of the multimedia content released by the releasing means MD depending on the identification of the tag having emitted the message of detection. As an alternative, the method may further prepare and then transmit a data message IO1, IO2, . . . , or IOn to the tag having previously emitted the message of detection of an electromagnetic field. Such a message may consist, in particular, in modifying the content of the storage means of said tag. The processing method implemented by the processing unit UC may be adapted or even replaced depending on whether the purpose of the device comprising an interactive system according to the invention changes. The same is true to adapt the processing associated with one or more active area(s) after a change in the multimedia content released by the device.

Besides, the interactive system according to the invention, is easily integrated in a device initially not designed to cooperate with such a system. Therefor a method has to be implemented to adapt any device comprising a control unit, means for releasing a multimedia content, the control unit cooperating with said means in order to provide the control thereof. Such a method comprises a step of integrating an interactive system into the device consisting in:

Positioning one or more tag(s)—such as the tag Ti disclosed while referring to FIG. 2—preferably at the back of the releasing means;

connecting the tag(s) to a processing unit (different from, or identical with the releasing means control unit) like the one described while referring to FIG. 1;

loading into the storage means of the processing unit a computer programme comprising instructions which can be used by the microcontroller of said processing unit which, when they are executed or interpreted trigger one or more action(s) in connection with the released content.

Such method may comprise a step of adapting the device control unit—if the latter is separated from the processing unit—so that it can receive and utilize requests for releasing emitted by the control unit to modify, if need be, the substance or the dynamics of the content released by the releasing means, in response.

The invention claimed is:

1. An interactive system (S) for a device comprising a control unit (UCd), means for releasing multimedia content (Md), with the control unit (UCd) cooperating with said means for providing the control thereof, wherein the system (S) comprises a processing unit (UC) including communication means (C1) and a microcontroller (U), at least one tag (T1, T2, Ti, Tn) to be affixed to said means for releasing (Md), with said at least one tag (T1, T2, Ti, Tn) including first wired communication means (Ct), distinct from the communication means (C1), for directly cooperating with the microcontroller (U) of the processing unit (UC) via the communications means (C1) of said processing unit (UC) and said at least one tag (T1, T2, Ti, Tn) including second communication means (At) to enable a wireless communication (CP) with a communication object (Oc), when the communication object (Oc) is within range of said at least one tag (T1, T2, Ti, Tn), with the processing unit (UC) being so arranged as to communicate with the control unit (UCd) in order to trigger an action implemented by the processing unit (UC) comprising transmission of a request for release (P1) to the processing unit (UC) for modifying a substance of the multimedia content released by the means for releasing (Md), in response to a communication initiated by said at least one tag (T1, T2, Ti, Tn) from the first wired communication means (Ct) directly to the communication means (C1) of said processing unit (UC).

2. The system according to claim 1, wherein said at least one tag (T1, T2, Ti, Tn) comprises a memory (Mt), the content thereof can be read by a communication object (Oc) when a communication (CP) is established between the tag and said object, said at least one action implemented by the processing unit comprising the updating of the tag memory (Mt).

3. The system according to claim 1, comprising a plurality of tags (T1, T2, Ti, Tn) so configured as to be respectively affixed to said means for releasing (Md) and respectively communicating directly with the processing unit (UC).

4. The system according to claim 1, wherein the tag(s) cooperate(s) with the processing unit (UC) through a wire, parallel, linear or ring bus (B).

5. The system according to claim 1, wherein the or one of the tags (T, T2, Tn) emits a message of detection of an electromagnetic field (FD1, FD2, FDn) when said tag has detected the presence of an electromagnetic field generated by a communication object (Oc).

6. The system according to claim 5, wherein the processing unit (UC) further communicates with the or one of the tags (T1, T2, Tn) through a data message (IO1, 102, IOn).

7. The system according to claim 1, wherein the processing unit (UC) comprises communication means (C2) for communicating (P2) with a second remote processing unit (UD).

8. A device comprising a control unit (UCd), means for releasing (Md) multimedia content, with the control unit (UCd) cooperating with said means (Md) to provide the control thereof, further comprising an interactive system (S) according to claim 1.

9. The device according to claim 8 the-preceding claim, wherein the processing unit (UC) constitutes the same physical entity with the control unit (UCd).

10. The device according to claim 9, wherein the means for releasing (Md) comprise a front wall comprising a screen (Ed).

11. The device according to claim 10, wherein the means for releasing include a translucent wall associated with capacitive or optical means for detecting a pointer; with said means being so configured as to determine the position of an object positioned in front of the screen.

12. A method for adapting a device comprising a control unit (UCd), means for releasing (Md) multimedia content, with the control unit cooperating with said means (Md) for ensuring the control thereof, including a step of integrating an interactive system (S) according to claim 1, into said device (1).

13. A method implemented by a processing unit (UC) of an interactive system according to claim 5, including a step of receiving, through the communication means (C1) of the processing unit (UC), a message of detection of an electromagnetic field (FD1, FD2, FDn) emitted by the or one of the tags (T1, T2, Tn) of the system, a step of knowing the tag having emitted said message, a step of requesting a modification in the substance of the multimedia content released by the means for releasing (Md) according to the tag having emitted the detection message.

14. The method according to claim 13, comprising a step of transmitting a data message (IO1, I02, Ion) to the tag (T1, T2, Tn) having released a message of detection of an electromagnetic field (FD1, FD2, FDn) beforehand, with said data message consisting in modifying the content of a tag memory (Mt).

15. A computer program product stored on a non-transitory storage support and comprising instructions which can be processed by the microcontroller (U) of the processing unit (UC) of an interactive system (S), the said interactive system comprises a processing unit (UC) including communication means (C1) and a microcontroller (U), at least one tag (T1, T2, Ti, Tn) to be affixed to said means for releasing (Md), with said at least one tag (T1, T2, Ti, Tn) including first wired communication means (Ct), distinct from the communication means (C1), for directly cooperating with the microcontroller (U) of the processing unit (UC) via the communications means (C1) of said processing unit (UC) and said at least one tag (T1, T2, Ti, Tn) including second communication means (At) to enable a wireless communication (CP) with a communication object (Oc), when the communication object (Oc) is within range of said at least one tag (T1, T2, Ti, Tn), with the processing unit (UC) being so arranged as to communicate with the control unit (UCd) in order to trigger an action implemented by the processing unit (UC) comprising transmission of a request for release (P1) to the processing unit (UC) for modifying a substance of the multimedia content released by the means for releasing (Md), in response to a communication initiated by said at least one tag (T1, T2, Ti, Tn) in response to a communication initiated by said at least one tag (T1, T2, Ti, Tn) from the first wired communication means (Ct) directly to the communication means (C1) of said processing unit (UC), wherein at least one of the tags (T, T2, Tn) emits a message of detection of an electromagnetic field (FD1, FD2, FDn) when said tag has detected the presence of an electromagnetic field generated by a communication object (Oc).

* * * * *

UNITED STATES PATENT AND TRADEMARK OFFICE
CERTIFICATE OF CORRECTION

Page 1 of 1

PATENT NO. : 9,626,535 B2
APPLICATION NO. : 14/179948
DATED : April 18, 2017
INVENTOR(S) : Tim Baker and Vincent Berge It is certified that error appears in the above-identified patent and that said Letters Patent is hereby corrected as shown below:

On the Title Page (73) Assignee: "OXO, Marseille (FR)" should read --THINK AND GO NFC, Meyreuil (FR)--

Signed and Sealed this
Twenty-fourth Day of July, 2018

Andrei Iancu
*Director of the United States Patent and Trademark Office*